Oct. 8, 1968   H. L. NELSON   3,405,221

DIRECTION AND RATE OF TURN REFERENCE SYSTEM

Filed Aug. 12, 1963

Inventor Harry L Nelson

United States Patent Office 3,405,221
Patented Oct. 8, 1968

3,405,221
DIRECTION AND RATE OF TURN
REFERENCE SYSTEM
Harry L. Nelson, 1727 Woodland Ave., Apt. 1,
Palo Alto, Calif. 94303
Filed Aug. 12, 1963, Ser. No. 301,679
3 Claims. (Cl. 35—10.2)

This invention relates to the art of executing turns in aircraft or aircraft flight simulators during actual or simulated flight conditions, particularly under instrument flight rules.

The primary aim of this invention is the provision of an apparatus for comparing actual with desired aircraft direction at any given moment in a turn while making turns in aircraft or aircraft flight simulators under actual or simulated instrument flight conditions.

This invention has a further primary objective of providing a means of determining the difference between the actual rate of turn of the aircraft or aircraft flight simulator at any given moment in a turn during actual or simulated instrument flight conditions and the desired rate of turn.

A further aim of this invention is to provide such actual and desired direction and rate information in one instrument by comparison of the relative positions of its indicators rather than comparison of their numerical values.

Other objects of this invention will appear during the course of the following specification, referring to the accompanying drawing, wherein.

Figure 1:
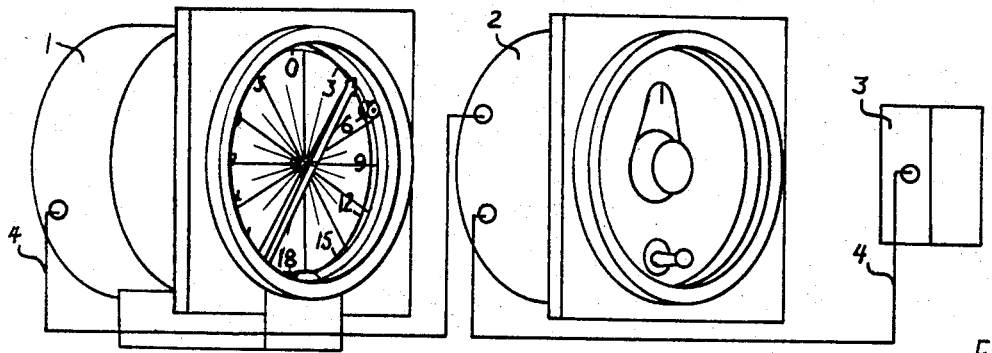
FIG. 1 is a diagrammatical view illustrating an instrument for comparing actual with desired direction of an aircraft or aircraft flight simulator at any given moment during a turn, and for simultaneously displaying the difference between the averaged actual rate of turn and the desired rate of turn.

Prior to referring specifically to the parts of the apparatus diagrammatically illustrated in the drawing, clarification of the theory upon which the invention is predicated will be made by explaining experiments heretofore conducted having a bearing on the practicability and utility of the invention.

During the course of practicing a series of turns of 450 degrees or more in an aircraft flight simulator under simulated instrument flight conditions, the inventor noted that by starting clockwise (right) turns at the time at which the position of the sweep second hand of the clock on the flight simulator instrument panel corresponded to the position of the compass needle of the remote indicating-type magnetic compass, and by adjusting the rate of turn so as to cause the compass needle to follow the clock sweep second hand at one half its turning rate, duplicating the standard aircraft instrument turn rate of 3 degrees per second, orientation as to both direction and rate of turn was more easily maintained. It was found less difficult to compare the relative positions of the two indicator needles than to interpret their separate numerical values.

Later, plans for a clock driven instrument were developed in which the face of the instrument was marked off in degrees as on a compass rose, and mounted two sweep hands turning in opposite directions at a half a revolution per minute—3 degrees per second rate of aircraft standard instrument turns. This instrument, when mounted adjacent to the direction indicator of the magnetic compass, permitted comparing the actual and desired direction and rate in turns of either direction by comparing the synchronization of the compass needle with the appropriate sweep hand. The clock driven device with contra-rotating sweep hands was replaced by one in which a single reversible motor driven sweep hand could be rotated in the desired direction at controllable rates by means of a switch and rheostat.

The instrument of FIG. 1 was developed by substituting a single rotatable disc marked with radical reference lines, for rotating sweep hand and mounting this disc directly on the direction indicator unit of the magnetic compass behind the compass needle. Rotating the disc in the direction of the turn at the standard instrument turn rate of 3 degrees per second by means of a reversible motor provided in one instrument the turn direction and rate information developed previously by two separate instruments.

Figure 2:
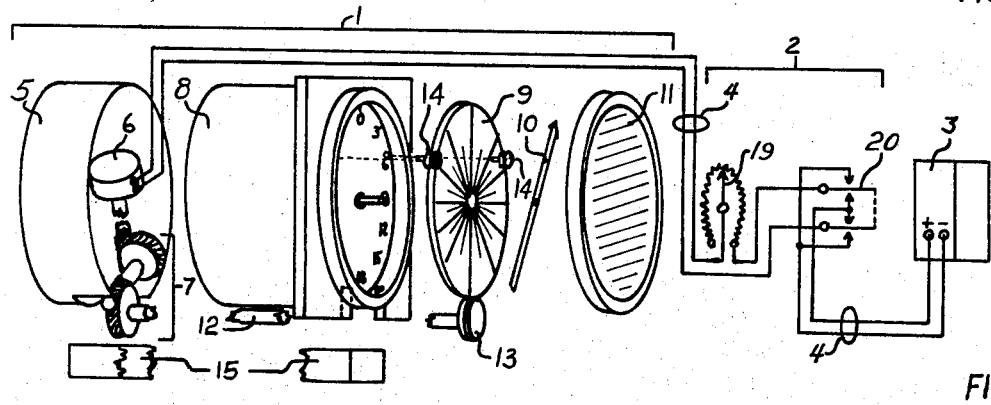
FIG. 2 is a detailed exploded diagrammatical and schematical view illustrating the construction of the instrument shown in FIG. 1.

The instrument system diagrammatically illustrated in FIG. 1 and FIG. 2 comprises a unit 1, including a magnetic or gyroscopic direction indicator needle or index, marker element drive mechanism 8, a combination direction and rate of turn reference disc 9, a compass direction indicator needle or index marker element 10, a reversible electrical motor 6, speed reduction gears 7, a drive shaft 12, a variable resistor 19, for controlling the speed of rotation of motor and disc, a switch 20 for controlling the direction of rotation of the motor and disc, and the aircraft or aircraft flight simulator low voltage D-C power supply 3. A separate housing 2 mounts the variable resistor 19 and switch 20.

The magnetic or gyroscopic direction indicator needle or index marker element drive mechanism 8 may be any of several units of this type now commercially available and serves to position the compass direction indicator needle or index marker element 10, mounted in a conventional manner over a compass rose element on its face, to the direction of flight assumed by the aircraft or aircraft flight simulator. In this respect the drive mechanism and compass rose element 8 and the compass needle or index marker element 10 comprise a conventional direction indicating mechanism.

The direction and rate of turn reference disc 9 is a thin transparent disc mounted between the face of the magnetic or gyroscopic drive mechanism 8 and the compass needle or index marker element 10 in such a manner as to not interfere with their normal direction indicating function. The reference disc 9 has radial lines on it at regular intervals to serve as reference marks for use in synchronizing the compass needle or index marker element 10 with it during turns, and is driven by the reversible motor 6 through the speed reduction gears 7 and the drive shaft 12 turns the reference disc 9. Small idle-bearings 14 maintain the reference disc 9 in its position between the face of the drive mechanism 2 and the compass needle or index marker element 10. A transparent cover 11 protects the face of the instrument.

The reversible motor 6 is a small D-C electric motor mounted on the rear of the drive mechanism 8 and operating directly from the aircraft or aircraft flight simulator low voltage D-C power supply 3, through variable resistor 19 and switch 20. The speed reduction gears 7 are mounted on the rear of the reversible motor 6 and are a dual set of conventional worm gears which reduce the reversible motor 6 normal operating speed to that of the reference disc 9. The drive shaft 12 is a small diameter metal shaft extending along the outside of the drive mechanism 8 linking the speed reduction gears 7 to the reference disc 9 drive wheel 13. The drive wheel 13 is a small rubber disc with a grooved rim which presses against that of the reference disc 9 and drives it through friction. The idler bearings 14 are small diameter bearings with grooved rims. The reference disc 9 is held in position by the grooves of the idler bearings 14 and drive wheel 13.

The variable resistor 19 is a standard type commercial rheostat used to control the amplitude of the voltage applied to the reversible motor 6 and therefore control the speed of rotation of the reference disc 9. It is designated as the turn rate control.

The switch 20 is a double pole-double throw type which has an OFF center position and can be either manually or automatically actuated to apply power from the aircraft or aircraft flight simulator low voltage D-C power supply 3 to the reversible motor 6 so as to cause the reference disc 9 to turn in the desired direction.

Figure 3:
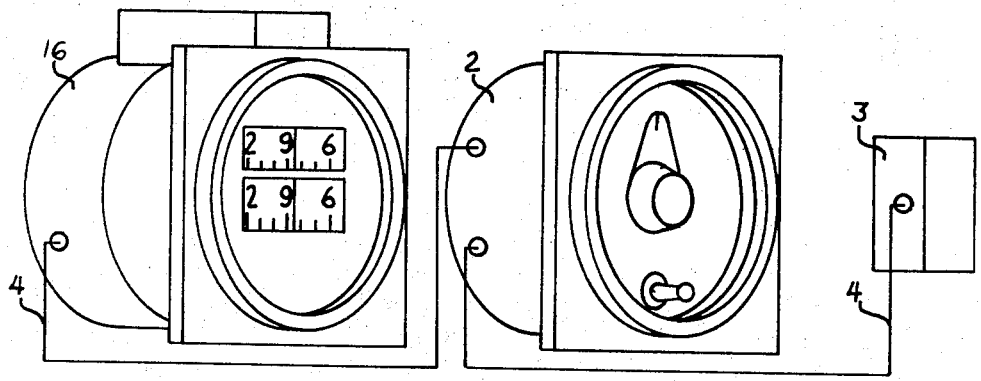
FIG. 3 is a diagrammatical view illustrating an instrument constructed with a rotatable drum type of direction and reference indicator capable of performing the functions of the instrument illustrated in FIG. 1.
Figure 4:
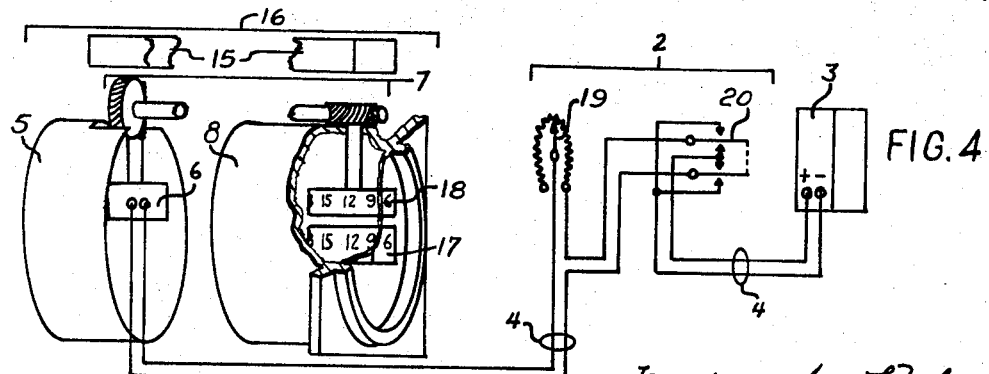
FIG. 4 is a detailed exploded diagrammatical and schematical view illustrating the construction of the instrument shown in FIG. 3.

The instrument diagrammatically illustrated in FIGS. 3 and 4 comprise another type of gyroscopic directional indicator 16, which utilizes a conventional drum type of directional gyro indicator 17. A reference drum 18 is mounted immediately above the directional indicator drum 17. The reference drum 18 is driven through speed reduction gears 7 by a reversible electric motor 6. The speed of the motor 6 is controlled by a variable resistor 19, while the motor 6 direction of rotation is controlled by a switch 20. The speed reduction gears 7, reversible motor 6, variable resistor 19, and switch 20 are similar to their counterparts in FIG. 2. The reference drum 18 is marked with reference lines at regular intervals to facilitate synchronization of the direction indicator drum 17 with it in turns. A drive shaft cover 15 protects the speed reduction gears 7.

In practice, for example, the pilot of the aircraft or aircraft flight simulator compares the relative positions of the reference disc 9 or drum 18 with the directional indicator needle or index marker element 10 or drum 17. If his turn is to be made without correction for wind drift, he would set his turn rate control (variable resistor 19) to its mid-range position which produces a standard instrument turn rate of 9 degrees per second of reference disc 3 or drum 18. He then enters the desired turn while simultaneously manually or automatically activating switch 20 so as to rotate the reference disc 9 or drum 18 in the desired direction and adjusts his angle of bank to keep the direction indicator needle or index marker element 10 or drum 17 rotating at the same rate, i.e., in synchronization with the reference disc 9 or drum 18.

If his aircraft or aircraft flight simulator's actual turn rate should become slower than the desired rate, the directional indicator needle or index marker element 10 or drum 17 will begin to lag behind its initial position with respect to the reference disc 9 or drum 18. The actual amount of lag corresponds to the actual amount of direction error permitting the pilot not only to correct his actual turning rate, i.e. increase it so as to match that of the reference disc 9 or drum 18, but to deliberately overcorrect (increase) the actual turing rate so as to overcome and eliminate the direction lag and then to slow the actual turning rate down slightly to again achieve and maintain synchronization. If his actual turning rate had initially become too fast, the directional indicator needle or index marker element 10 or drum 17 would have begun to lead the reference disc 9 or drum 18 and the correction process would be the reverse of that in the above example; i.e. the resulting directional lead would be eliminated first by slowing the actual turn rate until the directional indicator needle or index marker element 10 or drum 17 had dropped back to its original position with respect to the reference disc 9 or drum 18, and then increasing the actual turning rate slightly to again achieve and maintain synchronization. When the directional indicator needle or index marker element 10 or drum 17 approaches the desired heading the pilot makes his recovery from the turn so as to roll out on the desired heading. After completing the turn, the pilot deactivates the reversible motor 6.

In order for an aircraft to establish and repeat a given flight track, such as a standard holding pattern, with relation to fixed reference points on the earth's surface when cross winds are present, the downwind drift effect must be compensated for. This can be accomplished by heading into the wind slightly on straight track legs and by increasing the rate of turn when turning towards the downwind direction and by decreasing the rate of turn when turning towards the upwind direction. The amount of change in turning rate can be computed if the various factors involved are known and the computing procedure understood by the pilot. In actual practice both of these conditions are not usually met and the correction factor is first estimated and then refined by experiment.

Beacuse the same drift factors are present in the straight leg portions of the above pattern as in the turns, the drift correction angle used to compensate for drift on the straight leg portions can be used as a basis of turn rate correction in both the downwind and the upwind turns. The correction can be made by calibrating the turn rate control, variable resistor 19, in terms of wind correction angles with one set on the right (counter-clockwise rotation) side of its mid-range point for upwind turns and a separate set on the right (clock-wise rotation) side of the mid-range point for downwind turns. The wind correction angle calibration intervals should be in degrees and cover at least 30 degrees of wind correction angle. The exact calibration will depend on the particular reversible motor 6-variable resistor 19 combination used and will have to be determined experimentally for each combination. These combinations will also depend on the normal operating voltage of the particular aircraft or aircraft flight simulator low voltage D-C power supply 3.

In order to execute either half of a standard holding pattern ground track in a cross wind the pilot establishes the necessary wind correction angle on the first straight leg and sets this angle on the turn rate control, variable resistor 19, on the side of its mid-range point corresponding to the direction, upwind or downwind, of the intended turn. At the proper time he rolls his aircraft or aircraft flight simulator into the turn while simultaneously activating the reversible motor 6 through switch 20. He adjusts his rate of turn to maintain synchronization of the directional indicator needle or index marker element 10 or 17 with the reference disc 9 or drum 18, until they approach the desired heading at which time he begins his recovery from the turn so as to roll out on the desired heading. After completing the turn he deactivates the reversible motor 6.

Devices may be added to automatically operate switch 20, and for variable resistor 19.

It is realized that apparatus for comparing the actual with desired direction and rate of turn, having physical characteristics different from those illustrated and described, might be made without departing from the spirit of the invention or the scope of the appended claims.

Having thus described the invention, what is claimed as new and desired to be secured by Letters Patent is:

1. A direction and rate of turn reference system comprising:
   (A) a direction indicating compass comprising:
      (1) a compass rose element of circular configuration and being angularly calibrated about its periphery,
      (2) an index marker element positioned with respect to said compass rose element to designate particular angular designations on said compass rose element as a function of orientation of said compass, and
      (3) one of the two said elements, said compass rose element or said index marker element, being movable with respect to the other to accomplish an indicated change of indication upon change of orientation of said compass;
   (B) a rate of turn directing means including an indicator corresponding to the movable element of said elements of said compass and said indicator being positioned in concentric alignment with the movable said element to display an aligned presentation with said movable said element when the movable said element and said indicator are moved in position about their axis at the same rate of rotation; and (C) rotational driving means coupled to said directing means for rotating said indicator in either direction of rotation and at a selected rate of rotation.

2. The direction and rate of turn reference system set forth in claim 1 wherein said compass rose element is the movable said element.

3. The direction and rate of turn reference system set forth in claim 1 wherein said index marker element is the movable said element.

References Cited

UNITED STATES PATENTS

| | | | |
|---|---|---|---|
| 2,532,974 | 12/1950 | Warner | 35—10 |
| 2,614,251 | 10/1952 | Ergen | 235—150.26 X |
| 2,809,444 | 10/1957 | Woods | 35—10.2 |
| 2,896,145 | 7/1959 | Snodgrass | 235—150.26 X |
| 2,928,187 | 3/1960 | Draganjac | 35—10.2 |
| 3,114,788 | 12/1963 | Hemstreet | 35—10.2 |

MALCOLM A. MORRISON, *Primary Examiner.*

J. F. RUGGIERO, *Assistant Examiner.*